United States Patent
Satake et al.

(10) Patent No.: US 8,878,472 B2
(45) Date of Patent: Nov. 4, 2014

(54) MOTOR DRIVING CIRCUIT AND METHOD, AND COOLING DEVICE AND ELECTRONIC APPARATUS USING THE SAME

(75) Inventors: Toshikazu Satake, Kyoto (JP); Hiroyuki Ishii, Kyoto (JP)

(73) Assignee: Rohm Co., Ltd. (JP)

( * ) Notice: Subject to any disclaimer, the term of this patent is extended or adjusted under 35 U.S.C. 154(b) by 296 days.

(21) Appl. No.: 13/427,448

(22) Filed: Mar. 22, 2012

(65) Prior Publication Data
US 2012/0242264 A1 Sep. 27, 2012

(30) Foreign Application Priority Data

Mar. 22, 2011 (JP) .................................. 2011-063110

(51) Int. Cl.
*H02P 6/06* (2006.01)
*H02P 6/00* (2006.01)

(52) U.S. Cl.
CPC ..................................... *H02P 6/008* (2013.01)
USPC .................................................. 318/400.06

(58) Field of Classification Search
CPC ................................ H02P 6/16; G01D 5/145
USPC ................................................... 318/400.06
See application file for complete search history.

(56) References Cited

U.S. PATENT DOCUMENTS

| | | | | |
|---|---|---|---|---|
| 4,737,710 A * | 4/1988 | Van Antwerp et al. | .... | 324/207.2 |
| 5,959,418 A * | 9/1999 | Gotou | ....................... | 318/400.27 |
| 6,268,721 B1 * | 7/2001 | Schroeder et al. | ........ | 324/207.25 |
| 6,346,808 B1 * | 2/2002 | Schroeder | ................ | 324/207.21 |
| 7,649,329 B2 * | 1/2010 | Cheng | ...................... | 318/400.05 |
| 7,936,166 B2 * | 5/2011 | Olivieri et al. | ........... | 324/207.18 |

FOREIGN PATENT DOCUMENTS

JP 2005-224100 A 8/2005

* cited by examiner

*Primary Examiner* — Erick Glass
(74) *Attorney, Agent, or Firm* — Cantor Colburn LLP

(57) ABSTRACT

A driving device capable of driving a motor more efficiently is provided. A zero-crossing detection comparator 10 compares a pair of Hall signals H+ and H− having reverse phases and representing a rotor position of a fan motor 6, and generates a level-shifted zero-crossing detection signal S1 at each zero-crossing timing when the Hall signals cross each other. A control circuit 20 receives the zero-crossing detection signal S1, switches a driving phase at each zero-crossing timing to rotationally drive the motor, and regeneratively controls the motor during a duration from a first time point ahead of each zero-crossing timing by a first time width τ1 to a second time point behind each zero-crossing timing by a second time width τ2 shorter than the first time width τ1.

13 Claims, 4 Drawing Sheets

MOTOR DRIVING CIRCUIT AND METHOD, AND COOLING DEVICE AND ELECTRONIC APPARATUS USING THE SAME

BACKGROUND OF THE INVENTION

1. Field of the Invention

The present invention relates to a motor driving circuit for controlling rotation of a motor.

2. Description of the Related Art

A brushless direct current (DC) motor is used to enable a cooling fan or disc medium to rotate. The brushless DC motor generally includes a rotor having a permanent magnet and a stator having a coil, in which the coil is energized by controlling the current supplied to the coil, so as to enable the rotor to rotate relative to the stator. Generally, the brushless DC motor has a sensor such as a Hall element or an optical encoder for detecting the rotational position of the rotor, and the current supplied to the coil in each phase is switched according to the position detected by the sensor, thereby providing a suitable torque for the rotor.

PRIOR ART DOCUMENT

Patent Document

[Patent Document 1] Japanese Patent Publication No. 2005-224100

SUMMARY OF THE INVENTION

Problem to be Solved by the Invention

In a motor, at zero-crossing timing when phase shift occurs, a current flows through a coil along with generation of a counter electromotive force, and due to the current, vibration or noise occurs, or the efficiency is lowered. The motor driving circuit disclosed in Patent Document 1 detects the zero-crossing timing by comparing a pair of Hall signals, and changes a motor driving signal in intervals ahead of and after the zero-crossing timing, so as to reduce vibration or noise and power consumption.

In view of the above, one of exemplary objectives according to one aspect of the present invention is to provide a driving device capable of driving a motor more efficiently.

Technical Means for Solving the Problem

One aspect of the present invention relates to a motor driving circuit for driving a single-phase brushless motor. The motor driving circuit includes: a zero-crossing detection comparator, for comparing a pair of Hall signals having reverse phases and representing a rotor position of the motor, and generating a level-shifted zero-crossing detection signal at each zero-crossing timing when the Hall signals cross each other; and a control circuit, for receiving the zero-crossing detection signal, switching a driving phase at each zero-crossing timing to rotationally drive the motor, and regeneratively controlling the motor during a duration from a first time point ahead of each zero-crossing timing by a first time width to a second time point behind each zero-crossing timing by a second time width shorter than the first time width.

According to this aspect, by enabling the second time width to be shorter than the first time width, the current flowing through the coil of the motor is restrained from increasing during shifting from rotary driving to regenerative control, and the current can flow through the coil of the motor quickly during shifting from regenerative control to rotary driving, so that the driving efficiency can be improved.

According to one aspect, the driving circuit can further include a differential amplifier for amplifying a difference between the pair of Hall signals and generating a differential signal corresponding to the difference. The control circuit can further include a first timing comparator for comparing the differential signal with a specific first threshold voltage and generating a first timing signal representing a comparison result, and can set the first time point according to the first timing signal.

In this case, the length of the first time width can be adjusted according to the first threshold voltage.

The control circuit can also set the second time point according to the zero-crossing detection signal.

The control circuit can also latch the zero-crossing detection signal by a clock signal having a period corresponding to the second time width, and set the second time point according to the latched zero-crossing detection signal.

In this case, a duration specified according to the period of the clock signal can be set as the second time width.

The first threshold voltage can be set externally from the motor driving circuit. In this case, the length of the first time width can be set according to the motor type or motor speed.

According to one aspect, the driving circuit can further include a differential amplifier for amplifying a difference between the pair of Hall signals and generating a differential signal corresponding to the difference. The control circuit can further include a second timing comparator for comparing the differential signal with a specific second threshold voltage and generating a second timing signal representing a comparison result, and can set the second time point according to the second timing signal.

In this case, the length of the second time width can be adjusted according to the second threshold voltage.

According to one aspect, the driving circuit can further include a differential amplifier for amplifying a difference between the pair of Hall signals and generating a differential signal corresponding to the difference. The control circuit can further include: a first timing comparator, for comparing the differential signal with a specific first threshold voltage and generating a first timing signal representing a comparison result; and a second timing comparator, for comparing the differential signal with a specific second threshold voltage and generating a second timing signal representing a comparison result; and sets the first time point according to the first timing signal, and sets the second time point according to the second timing signal.

In this case, the lengths of the first time width and the second time width can be adjusted according to the first threshold voltage and the second threshold voltage.

According to one aspect, at least one of the first threshold voltage and the second threshold voltage can be set externally from the motor driving circuit.

The control circuit can further include a timer circuit for starting time measurement upon the level shift of the zero-crossing detection signal, and set at least one of the first time point and the second time point according to an output of the timer circuit.

The motor driving circuit can also be integrally integrated on a semiconductor substrate. Furthermore, the integration herein includes a case where all the constituent elements of the circuit are formed on the semiconductor substrate and a case where main constituent elements of the circuit are integrally integrated, and a part of resistors or capacitors can also be disposed outside of the semiconductor substrate to adjust circuit constants.

Another aspect of the present invention is a cooling device. The cooling device includes: a single-phase brushless fan motor; a Hall element, for generating a pair of Hall signals having reverse phases and representing a rotor position of the fan motor; and the motor driving circuit according to any one of the above aspects, for driving the fan motor according to the pair of Hall signals.

Furthermore, another aspect of the present invention is an electronic apparatus. The electronic apparatus includes a processor and the cooling device for cooling the processor.

Effect of the Invention

The present invention can drive a motor more efficiently.

BRIEF DESCRIPTION OF THE DRAWINGS

The invention will be described according to the appended drawings in which.

PREFERRED EMBODIMENT OF THE PRESENT INVENTION

Figure 1:
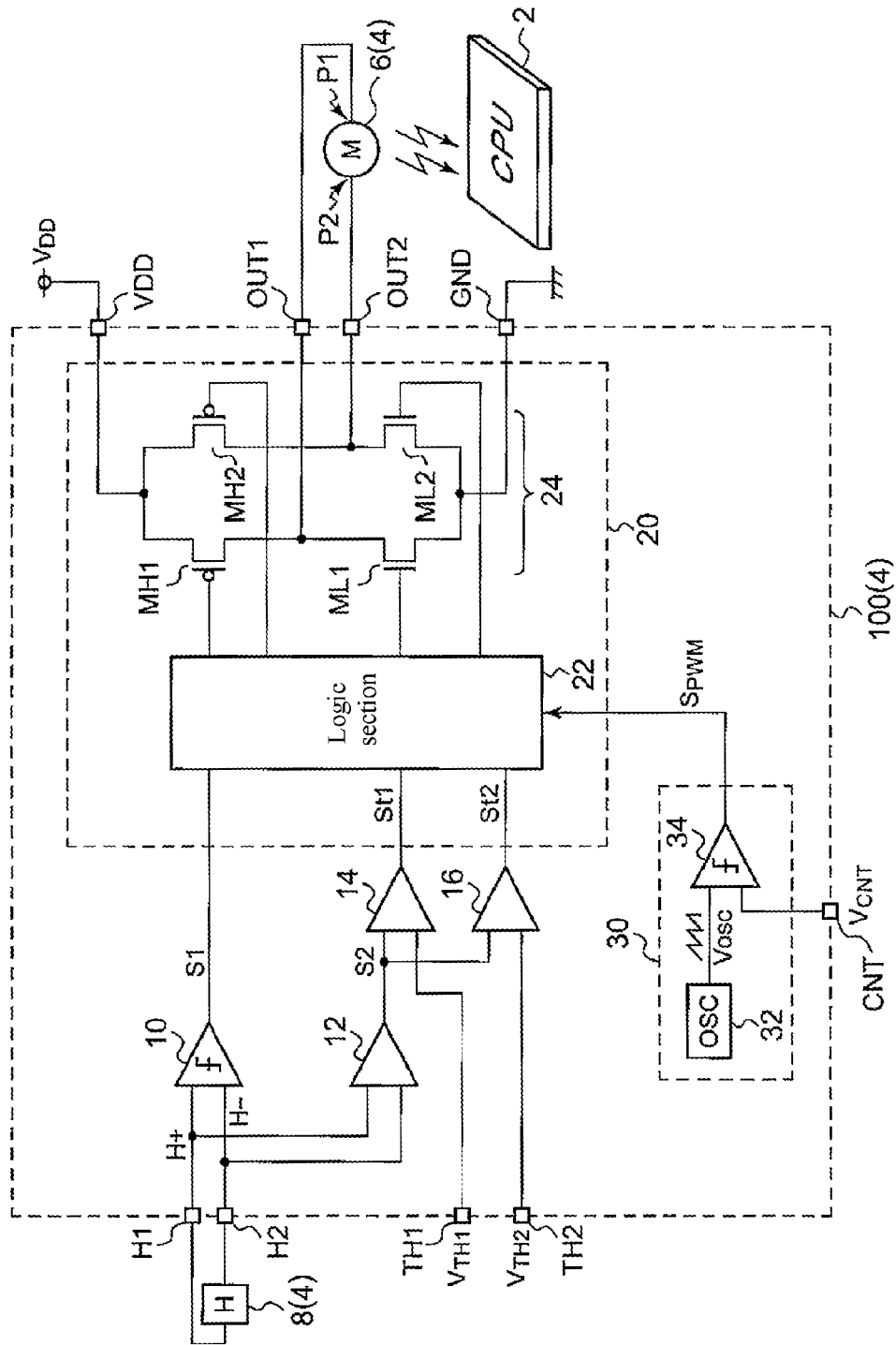
FIG. 1 is a circuit diagram of an electronic apparatus including a driving circuit according to a first embodiment.

The present invention will now be described based on preferred embodiments and the accompanying drawings. Same symbols are added to the same or equivalent constituent elements, members, processing shown in the drawings, and repeated description is properly omitted. Further, the embodiments are exemplary rather than to limit the present invention. All of the features and the combinations thereof described in the embodiments are not necessarily essential to the present invention.

In the present specification, "the state where a member A is connected to a member B" includes not only the state where the member A is physically and directly connected to the member B but also the state where the member A is indirectly connected to the member B via another member that does not affect the electrical connection state between them or does not impair the functions or effects of the combinations thereof. Likewise, "the state where a member C is disposed between a member A and a member B" includes not only the state where the member A and the member C, or the member B and the member C, are connected directly, but also the state where they are connected indirectly via another member that does not affect the electrical connection state between them or does not impair the functions or effects of the combinations thereof.

Also, in the present specification, symbols marking voltage signals, current signals or resistances can be set to represent corresponding voltage values, current values or resistance values as required.

(First Embodiment)

FIG. 1 is a circuit diagram of an electronic apparatus 1 including a driving circuit 100 according to a first embodiment. The electronic apparatus 1 includes a Central Processing Unit (CPU) 2 and a cooling device 4.

The cooling device 4 includes a single-phase brushless DC fan motor 6, a Hall element 8 and a driving circuit 100, and is modularized. The fan motor 6 is disposed facing the CPU 2 to be cooled, and an air flow is generated by rotation of the fan motor 6 to cool the CPU 2. The Hall element 8 is disposed close to the fan motor 6, and generates a pair of Hall signals (also briefly referred to as Hall signals) H+ and H− having reverse phases and representing a rotor position of the fan motor 6. The driving circuit 100 receives the Hall signals H+ and H−, and drives the fan motor 6 according to the Hall signals.

The specific structure of the driving circuit 100 is described below.

The driving circuit 100 includes a zero-crossing detection comparator 10, a differential amplifier 12, a first comparator 14, a second comparator 16 and a control circuit 20, and is integrally integrated on a semiconductor substrate.

A first output terminal OUT1 and a second output terminal OUT2 of the driving circuit 100 are connected to one end (first terminal) P1 and the other end (second terminal) P2 of the fan motor 6, respectively. The Hall element 8 is connected to Hall input terminals H1 and H2 of the driving circuit 100, and the pair of Hall signals H+ and H− is input to the Hall input terminals H1 and H2 of the driving circuit 100. The driving circuit 100 alternately switches the direction (driving phase) of the current flowing through the coil of the fan motor 6 according to the rotor position represented by the Hall signals H+ and H−, and at the same time drives the fan motor 6.

The zero-crossing detection comparator 10 compares voltage levels of the Hall signals H+ and H−, and generates a level-shifted zero-crossing detection signal S1 at each zero-crossing timing when the Hall signals cross each other.

The control circuit 20 receives the zero-crossing detection signal S1 and detects zero-crossing timing. Furthermore, the control circuit 20 alternately switches the driving phase (φ1, φ2), that is, the direction of the driving current, at each zero-crossing timing, and at the same time rotationally drives the fan motor 6.

At the first driving phase φ1, the control circuit 20 applies a high level voltage (power supply voltage $V_{DD}$) to the first terminal P1 of the fan motor 6, and applies a low level voltage (ground voltage $V_{GND}$) to the second terminal P2, so that a driving current flows in a direction from the first terminal P1 to the second terminal P2. At the second driving phase φ2, the control circuit 20 applies the low level voltage $V_{GND}$ to the first terminal P1 of the fan motor 6, and applies the high level voltage $V_{DD}$ to the second terminal P2, so that a driving current flows in a direction from the second terminal P2 to the first terminal P1.

The control circuit 20 includes a logic section 22 and a driver 24. The driver 24 is an H-bridge circuit including, for example, transistors MH1, MH2, ML1 and ML2. At the first driving phase φ1, the transistor MH1 is switched on and the transistor ML1 is switched off to apply the high level voltage $V_{DD}$ to the first terminal P1, and the transistor MH2 is switched off and the transistor ML2 is switched on to apply the low level voltage $V_{GND}$ to the second terminal P2. At the second driving phase φ2, the transistor MH1 is switched off and the transistor ML1 is switched on to apply the low level voltage $V_{GND}$ to the first terminal P1, and the transistor MH2 is switched on and the transistor ML2 is switched off to apply the high level voltage $V_{DD}$ to the second terminal P2.

The control circuit 20 can also drive the fan motor 6 by pulse width modulation (PWM).

A control voltage $V_{CNT}$ indicating the speed (or torque) of the fan motor 6 is externally input to a counter input terminal CNT. A pulse signal generating section 30 generates a pulse signal $S_{PWM}$ having a duty ratio corresponding to the control voltage $V_{CNT}$.

There may be various PWM driving modes. For example, in an upper-side PWM driving mode, at the first driving phase φ1, the transistor MH1 is switched on/off according to the pulse signal $S_{PWM}$, and at the second driving phase φ2, the transistor MH2 is switched on/off according to the pulse signal $S_{PWM}$.

In a lower-side PWM driving mode, at the first driving phase φ1, the transistor ML2 is switched on/off according to the pulse signal $S_{PWM}$, and at the second driving phase φ2, the transistor ML1 is switched on/off according to the pulse signal $S_{PWM}$.

In a two-side PWM driving mode, at the first driving phase φ1, the transistors MH1 and ML2 are switched on/off according to the pulse signal $S_{PWM}$, and at the second driving phase φ2, the transistors MH2 and ML1 are switched on/off according to the pulse signal $S_{PWM}$.

For example, the pulse signal generating section 30 includes an oscillator 32 and a comparator 34. The oscillator 32 generates a periodic voltage $V_{OSC}$ having a saw-tooth wave or triangular wave of a particular frequency. The oscillator 32 compares the control voltage $V_{CNT}$ with the periodic voltage $V_{OSC}$ and generates the pulse signal $S_{PWM}$. The pulse signal $S_{PWM}$ can also be directly input to a control terminal CNT.

The logic section 22 receives the zero-crossing detection signal S1 and the pulse signal $S_{PWM}$, and generates gate signals of the transistors MH1, MH2, ML1 and ML2 according thereto. It is to be understood by persons skilled in the art that the present invention is not particularly limited to the specific structure of the logic section 22.

The control circuit 20 regeneratively controls the fan motor 6 during a particular duration (referred to as a regenerative duration φ3) between the first driving phase φ1 and the second driving phase φ2 and including intervals ahead of and after the zero-crossing timing.

For example, during the regenerative duration φ3 of shifting from the first driving phase φ1 to the second driving phase φ2, the state where only the low-side transistor ML2 is on, the state where all the transistors are off and the state where only the low-side transistor ML1 is on are sequentially switched. On the contrary, during the regenerative duration φ3 of shifting from the second driving phase φ2 to the first driving phase φ1, the state where only the low-side transistor ML1 is on, the state where all the transistors are off and the state where only the low-side transistor ML2 is on can also be sequentially switched. The generative control enables the current to flow to the fan motor 6 through a local diode (parasitic diode) of the low-side transistor.

Moreover, it is to be understood by persons skilled in the art that the present invention is not particularly limited to the regenerative control mode.

In this embodiment, the start point of the regenerative duration φ3 is a first time point t1 ahead of each zero-crossing timing by a first time width T1, the end point of the regenerative duration φ3 is set as a second time point t2 behind each zero-crossing timing by a second time width τ2, and the second time width τ2 is set to be shorter than the first time width τ1.

To realize the regenerative duration φ3, the driving circuit 100 of this embodiment includes a differential amplifier 12, a first comparator 14 and a second comparator 16.

The differential amplifier 12 amplifies a difference between the Hall signals H+ and H− and generates a differential signal S2 corresponding to the difference. Specifically, the differential amplifier 12 generates a differential signal S2 having a voltage level corresponding to an absolute value of the difference between the Hall signals H+ and H−. For example, the differential amplifier 12 generates the differential signal S2 by amplifying the difference between the Hall signals H+ and H−, obtaining an absolute value of the amplified signal and inverting the absolute value of the signal. The differential signal S2 becomes a maximum periodic signal adopted at each zero-crossing timing.

The first comparator 14 compares the differential signal S2 with a specific first threshold voltage $V_{TH1}$ and generates a first timing signal St1 representing a comparison result. The second comparator 16 compares the differential signal S2 with a specific second threshold voltage $V_{TH2}$ and generates a second timing signal St2 representing a comparison result. The second threshold voltage $V_{TH2}$ is set to be higher than the first threshold voltage $V_{TH1}$.

The driving circuit 100 includes a first threshold voltage setting terminal TH1 and a second threshold voltage setting terminal TH2 for receiving the first threshold voltage $V_{TH1}$ and the second threshold voltage $V_{TH2}$ from the outside. That is, the first threshold voltage $V_{TH1}$ and the second threshold voltage $V_{TH2}$ can be set externally.

The control circuit 20 sets the first time point t1 as the start point of the regenerative duration φ3 according to the first timing signal St1, and sets the second time point t2 as the end point of the regenerative duration φ3 according to the second timing signal St2.

Figure 2:
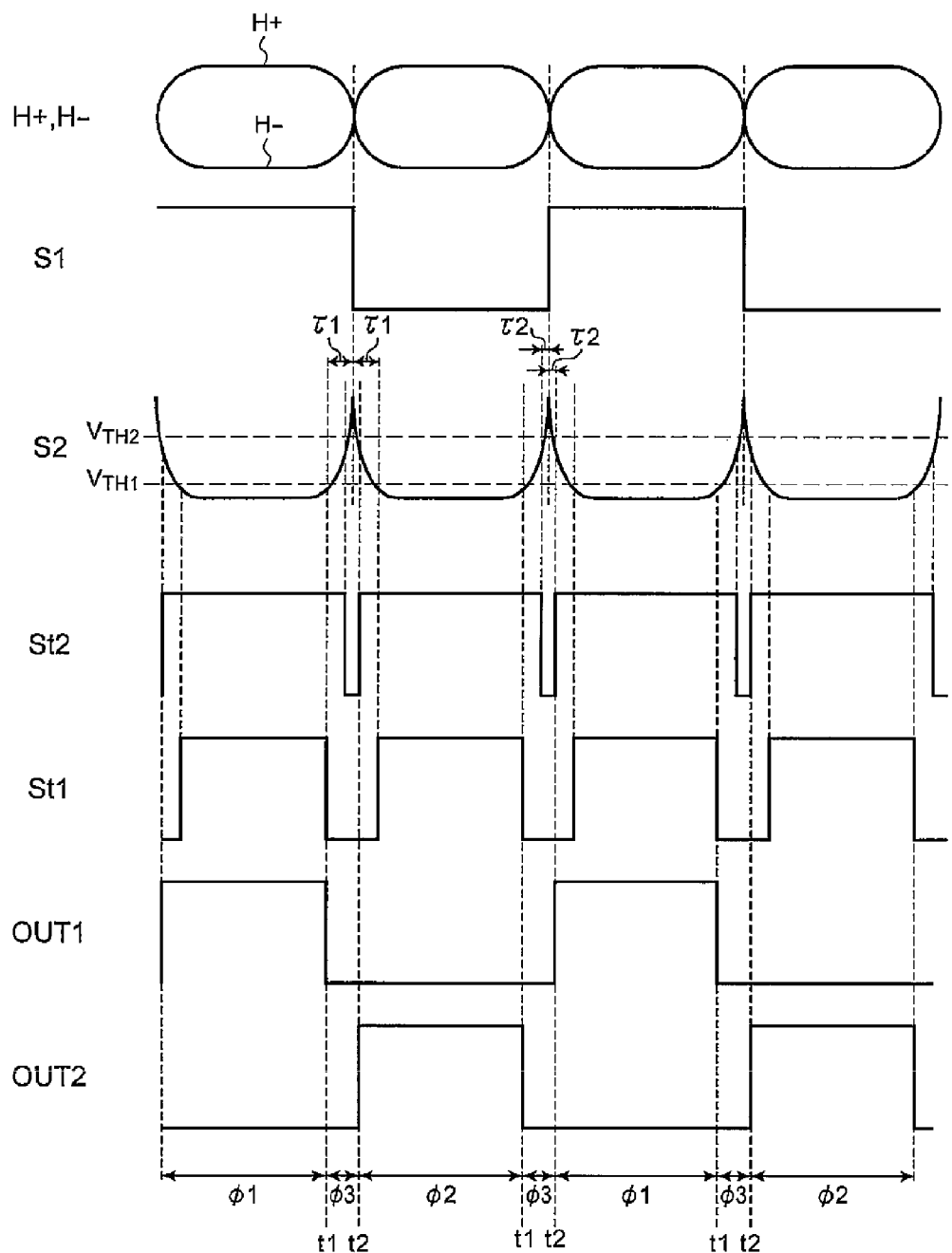
FIG. 2 is a timing chart illustrating the operation of the driving circuit of FIG. 1.

The configuration of the driving circuit 100 is described above. The operation thereof is described subsequently. FIG. 2 is a timing chart illustrating the operation of the driving circuit 100 of FIG. 1.

The first timing signal St1 shifts from a high level to a low level at a time point that is ahead of the zero-crossing timing by the first time width T1, and shifts from a low level to a high level at a time point that is behind the zero-crossing timing by the first time width τ1. The length of the first time width τ1 is specified according to the amplitude level of the differential signal S2 and the first threshold voltage $V_{TH1}$.

The second timing signal St2 shifts from a high level to a low level at a time point that is ahead of the zero-crossing timing by the second time width τ2, and shifts from a low level to a high level at a time point that is behind the zero-crossing timing by the second time width τ2. The length of the second time width τ2 is specified according to the amplitude level of the differential signal S2 and the second threshold voltage $V_{TH2}$.

In an interval where the zero-crossing detection signal S1 is at a high level, the control circuit 20 starts the first driving phase φ1 at a time point t2 when a positive edge of the second timing signal St2 is generated, and then ends the first driving phase φ1 and starts the regenerative duration φ3 at a time point t1 when a negative edge of the first timing signal St1 is generated.

Subsequently, in an interval where the zero-crossing detection signal S1 is at a low level, the control circuit 20 ends the regenerative duration φ3 and starts the second driving phase φ2 at the time point t2 when the positive edge of the second timing signal St2 is generated, and then ends the second driving phase φ2 and starts the regenerative duration φ3 at the time point t1 when the negative edge of the first timing signal St1 is generated.

The control circuit 20 drives the fan motor 6 by repeating the above operation.

Figure 3:
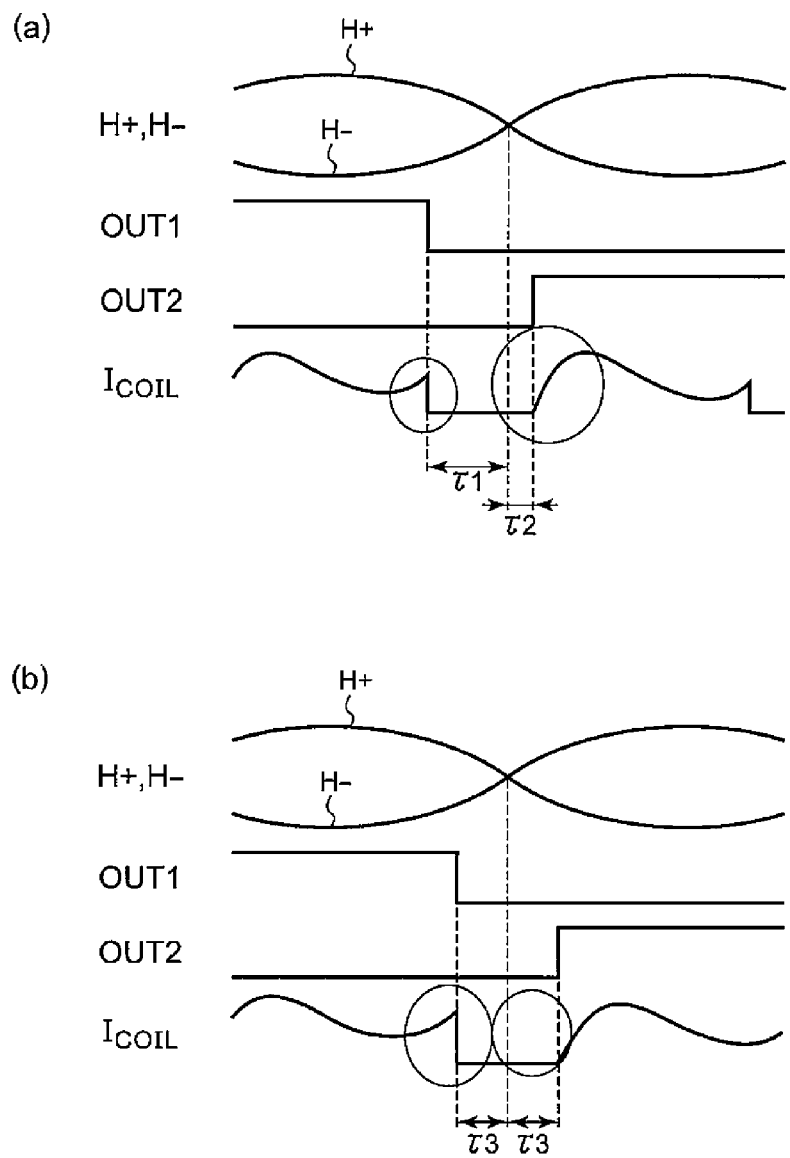
FIG. 3(a) is a waveform chart of a current when the driving circuit of FIG. 1 drives a fan motor.
FIG. 3(b) is a waveform chart of a current when a conventional driving circuit drives a fan motor.

FIG. 3(a) is a waveform chart of a current when the driving circuit 100 of FIG. 1 drives the fan motor 6, and FIG. 3(b) is a waveform chart of a current when a conventional driving circuit drives the fan motor 6.

First, reference is made to FIG. 3(b). In the conventional driving circuit, the same time width τ3 ahead of and behind the zero-crossing timing is set as a regenerative duration. The current $I_{COIL}$ flowing through the coil of the fan motor 6 increases abruptly before the regenerative duration starts, and becomes zero during the regenerative duration, and when a next driving duration starts, the coil current $I_{COIL}$ starts to flow. The abrupt increase of the coil current makes no contribution to the torque of the motor, and therefore is desirably to be restrained. Also, if the timing when the coil current $I_{COIL}$ starts to flow is delayed, the coil current $I_{COIL}$ of a next driving phase reduces correspondingly, which is undesirable. In the prior art, if the time width τ3 is prolonged, the abrupt increase of the current near the zero-crossing timing can be restrained, but the time when the current starts to flow through the coil is delayed at the next driving phase, thereby lowering the driving efficiency. Otherwise, if the time width τ3 is shortened, the time when the current starts to flow through the coil is advanced, but the current near the zero-crossing timing increases more abruptly, thereby lowering the driving efficiency.

Reference is made to FIG. 3(a). According to the driving circuit 100 of FIG. 1, by setting the first time width τ1 to be longer than the second time width τ2, the abrupt increase of the coil current $I_{COIL}$ is restrained, and the time when the current $I_{COIL}$ starts to flow through the coil in the next phase is advanced, so that the efficiency can be improved as compared with the prior art.

(Second Embodiment)

Figure 4:
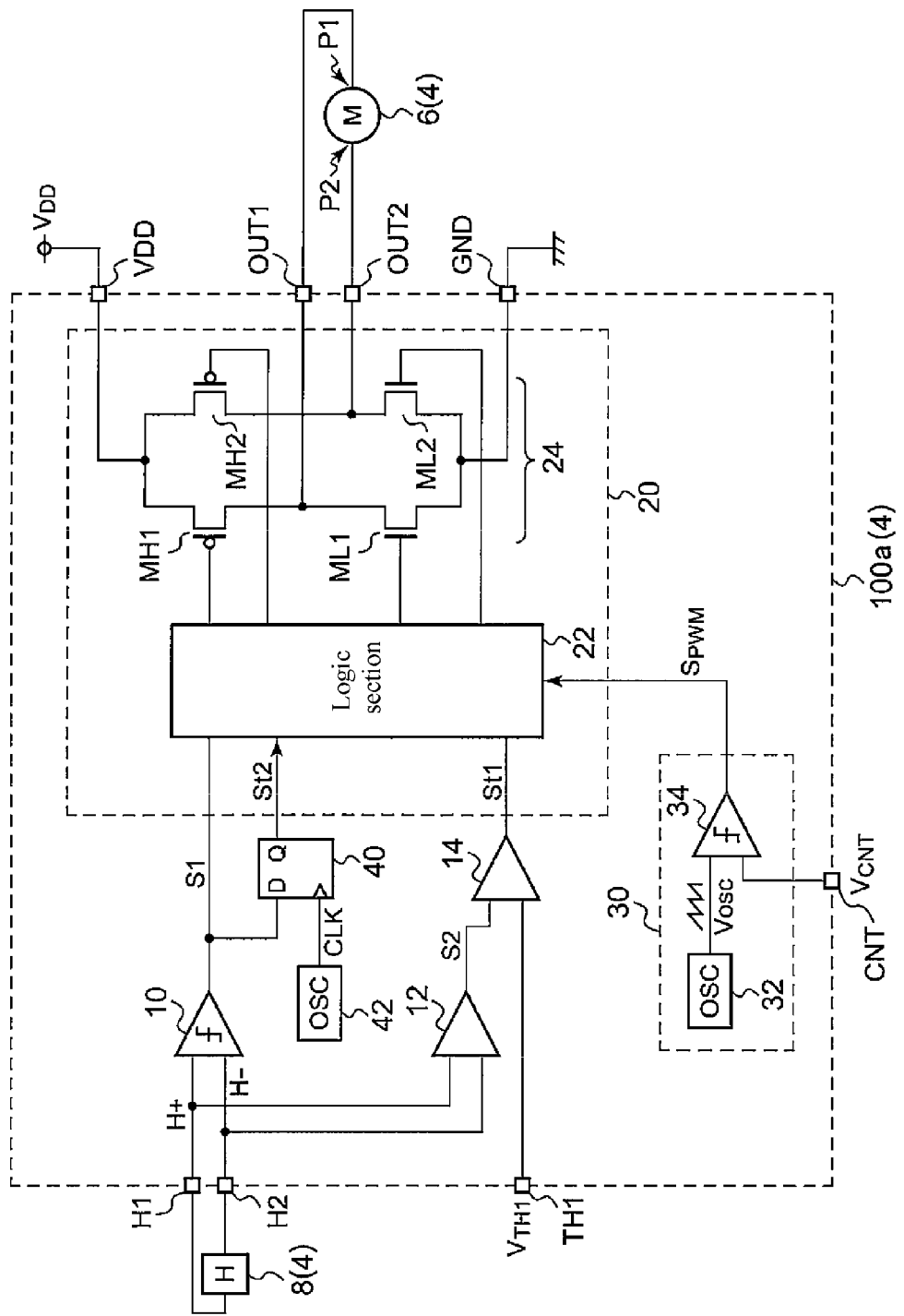
FIG. 4 is a circuit diagram of a driving circuit according to a second embodiment.

FIG. 4 is a circuit diagram of a driving circuit 100a according to a second embodiment. The driving circuit 100a includes a latch circuit 40 and an oscillator 42 that replace the second comparator 16. The oscillator 42 generates a clock signal CLK having a period $T_{CLK}$ corresponding to the second time width τ2. A zero-crossing detection signal S1 is input to an input terminal of the latch circuit 40, and the clock signal CLK is input to a clock terminal of the latch circuit 40. An output signal of the latch circuit 40 is used as the second timing signal St2 and output to the control circuit 20.

In the driving circuit 100a of FIG. 4, the second timing signal St2 serving as the output signal of the latch circuit 40 is level-shifted when a next clock signal CLK is input after the level shift of the zero-crossing detection signal S1.

The clock signal CLK is asynchronous with the zero-crossing detection signal S1, and therefore the delay time from the level shift of the zero-crossing detection signal S1 to the level shift of the second timing signal St2 has a minimum value being substantially zero, and a maximum value being substantially the period $T_{CLK}$ of the clock signal CLK. That is, the second time width τ2 changes from 0 to $T_{CLK}$.

Therefore, the period $T_{CLK}$ of the clock signal CLK is specified according to the optimal value of the second time width τ2, so as to satisfy the condition τ1>τ2, so that the driving efficiency can be improved like in the first embodiment.

Described above is an explanation of the present invention based on the embodiments. It is to be understood by persons skilled in the art that the above-described embodiments are merely exemplary, various variations in constituent elements and processes involved are possible, and such variations are also within the scope of the present invention. An example is given below.

The latch circuit 40 and the oscillator 42 in the second embodiment can be considered as a timer circuit for generating a level-shifted second timing signal St2 after the second time width τ2 behind the zero-crossing timing. Therefore, a timer circuit for starting time measurement upon the level shift of the zero-crossing detection signal S1 can also be used to form the latch circuit 40 and the oscillator 42. The timer circuit can also be formed by a digital counter or an analog circuit using capacitors.

Likewise, the timer circuit is also used to generate the first timing signal St1.

The logic setting of the high level and low level of the signal described in the embodiments is exemplary, various variations are taken into consideration in the structure of the logic circuit block, and such variations also fall within the scope of the present invention.

Description has been made in the embodiments regarding the case where the differential amplifier 12 generates the differential signal S2 by amplifying the difference between the Hall signals H+ and H−, obtaining an absolute value of the amplified signal and inverting the absolute value of the signal; however, the inversion process can also be omitted. In this case, the differential signal S2 shown in FIG. 2 becomes a vertically inverted waveform. Therefore, the first threshold voltage $V_{TH1}$ is set to be higher than the second threshold voltage $V_{TH2}$.

While embodiments of the present invention have been illustrated and described, various modifications and improvements can be made by persons skilled in the art. It is intended that the present invention is not limited to the particular forms as illustrated, and that all the modifications not departing from the spirit and scope of the present invention are within the scope as defined in the following claims.

What is claimed is:

1. A motor driving circuit, for driving a single-phase brushless motor, comprising:
   a zero-crossing detection comparator, for comparing a pair of Hall signals having reverse phases and representing a rotor position of the motor, and generating a level-shifted zero-crossing detection signal at each zero-crossing timing when the Hall signals cross each other;
   a control circuit, for receiving the zero-crossing detection signal, switching a driving phase at each zero-crossing timing to rotationally drive the motor, and regeneratively controlling the motor during a duration from a first time point ahead of each zero-crossing timing by a first time width to a second time point behind each zero-crossing timing by a second time width shorter than the first time width; and
   a differential amplifier, for amplifying a difference between the pair of Hall signals and generating a differential signal corresponding to the difference,
   wherein the control circuit comprises:
      a first timing comparator for comparing the differential signal with a specific first threshold voltage and generating a first timing signal representing a comparison result, and sets the first time point according to the first timing signal, and
      a second timing comparator for comparing the differential signal with a specific second threshold voltage and generating a second timing signal representing a comparison result, and sets the second time point according to the second timing signal.

2. The motor driving circuit according to claim 1, wherein the control circuit sets the second time point according to the zero-crossing detection signal.

3. The motor driving circuit according to claim 2, wherein the control circuit latches the zero-crossing detection signal by a clock signal having a period corresponding to the second time width, and sets the second time point according to the latched zero-crossing detection signal.

4. The motor driving circuit according to claim 3, wherein the first threshold voltage can be set from the outside of the motor driving circuit.

5. The motor driving circuit according to claim 2, wherein the first threshold voltage can be set from the outside of the motor driving circuit.

6. The motor driving circuit according to claim 1, wherein the first threshold voltage can be set from the outside of the motor driving circuit.

7. The motor driving circuit according to claim 1, wherein the control circuit comprises a timer circuit for starting time measurement upon the level shift of the zero-crossing detection signal, and sets at least one of the first time point and the second time point according to an output of the timer circuit.

8. The motor driving circuit according to claim 1, wherein the motor driving circuit is integrally integrated on a semiconductor substrate.

9. A cooling device, comprising a single-phase brushless fan motor;
a Hall element, for generating a pair of Hall signals having reverse phases and representing a rotor position of the fan motor; and
the motor driving circuit according to claim 1, for driving the fan motor according to the pair of Hall signals.

10. An electronic apparatus, comprising:
a processor; and
the cooling device according to claim 9, for cooling the processor.

11. A motor driving circuit, for driving a single-phase brushless motor, comprising:
a zero-crossing detection comparator, for comparing a pair of Hall signals having reverse phases and representing a rotor position of the motor, and generating a level-shifted zero-crossing detection signal at each zero-crossing timing when the Hall signals cross each other;
a differential amplifier, for amplifying a difference between the pair of Hall signals and generating a differential signal corresponding to the difference;
a first timing comparator, for comparing the differential signal with a specific first threshold voltage and generating a first timing signal representing a comparison result;
a second timing comparator, for comparing the differential signal with a specific second threshold voltage and generating a second timing signal representing a comparison result; and
a control circuit, for switching a driving phase at each zero-crossing timing to rotationally drive the motor, and regeneratively controlling the motor during a duration from a first time point corresponding to the first timing signal to a second time point corresponding to the second timing signal.

12. The motor driving circuit according to claim 11, wherein at least one of the first threshold voltage and the second threshold voltage can be set from the outside of the motor driving circuit.

13. The motor driving circuit according to claims 11, wherein the motor driving circuit is integrally integrated on a semiconductor substrate.

* * * * *